United States Patent
Evans et al.

(10) Patent No.: US 8,429,291 B2
(45) Date of Patent: Apr. 23, 2013

(54) PROTECTION OF NETWORK FLOWS DURING CONGESTION IN A COMMUNICATIONS NETWORK

(75) Inventors: John Evans, Frome (GB); Francois Le Faucheur, Valbonne (FR); Anna Charny, Sudbury, MA (US); Xinyang Zhang, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 12/592,047

(22) Filed: Nov. 18, 2009

(65) Prior Publication Data
US 2011/0119397 A1 May 19, 2011

(51) Int. Cl.
*G06F 15/16* (2006.01)

(52) U.S. Cl.
USPC .............................. 709/235; 709/224; 709/234

(58) Field of Classification Search .......................... None
See application file for complete search history.

(56) References Cited

U.S. PATENT DOCUMENTS

| | | | |
|---|---|---|---|
| 6,463,470 B1 * | 10/2002 | Mohaban et al. ............. | 709/223 |
| 6,798,746 B1 | 9/2004 | Kloth et al. | |
| 7,006,435 B1 | 2/2006 | Davies et al. | |
| 7,023,843 B2 | 4/2006 | Ruutu et al. | |
| 7,054,276 B2 | 5/2006 | Kaplan | |
| 7,061,864 B2 | 6/2006 | van Everdingen | |
| 7,173,908 B2 | 2/2007 | Davis et al. | |
| 7,355,977 B1 | 4/2008 | Li | |
| 7,389,356 B2 * | 6/2008 | Shao et al. ..................... | 709/235 |
| 7,697,422 B1 * | 4/2010 | Arad et al. ..................... | 370/229 |
| 2003/0103503 A1 * | 6/2003 | Dubuc et al. .................. | 370/392 |
| 2008/0112316 A1 | 5/2008 | Charny et al. | |
| 2008/0225712 A1 | 9/2008 | Lange et al. | |
| 2009/0193105 A1 | 7/2009 | Charney et al. | |
| 2011/0038382 A1 * | 2/2011 | Peterson et al. .............. | 370/401 |

FOREIGN PATENT DOCUMENTS
EP      1 157 502 B1      7/2005

OTHER PUBLICATIONS

Briscoe et al.,"An edge-toedge Deployment Model for Pre-Congestion Notification:Admission Control over a DiffServ Region", draft-briscoe-tsvwg-cl-architecture-04.txt,Oct. 25, 2006.

A. Bader, "RMD-QOSM—The Resource Management in Diffserv QOS Model", draft-ietf-nsis-rmd-07.txt, Jun. 23, 2006.

* cited by examiner

*Primary Examiner* — Mohamed Ibrahim
(74) *Attorney, Agent, or Firm* — Cindy Kaplan

(57) ABSTRACT

In one embodiment, an apparatus includes a processor for mapping packets associated with network flows to policy profiles independent of congestion level at the apparatus, and enforcing the policy profiles for the packets based on a congestion state. Packets associated with the same network flow are mapped to the same policy profile and at least some of the network flows are protected during network congestion. The apparatus further includes memory for storing the policy profiles. A method for protecting network flows during network congestion is also disclosed.

19 Claims, 4 Drawing Sheets

PROTECTION OF NETWORK FLOWS DURING CONGESTION IN A COMMUNICATIONS NETWORK

BACKGROUND

The present disclosure relates generally to communications networks, and more particularly, to protecting network flows during network congestion.

In a communications network, many different flows pass through links. Due to changes in traffic, topology changes, or failures within the network, for example, a link may become congested. Flows sharing a congested link can become affected and suffer possibly severe QoS (Quality of Service) degradation. In the presence of congestion, it is often necessary to drop at least a portion of packets entering the congested link or introduce queuing delays.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and apparatus for protection of one or more network flows during congestion in a communications network are disclosed.

In one embodiment, a method generally comprises receiving packets associated with network flows at a network device and processing the packets at the network device. Processing comprises mapping the packets to policy profiles independent of congestion level at the network device. Packets associated with the same network flow are mapped to the same policy profile. The method further comprises enforcing the policy profiles for the packets based on a congestion state at the network device. At least some of the network flows are protected during network congestion.

An apparatus generally comprises a processor for mapping packets associated with network flows to policy profiles independent of congestion level at the apparatus and enforcing the policy profiles for the packets based on a congestion state at the apparatus. Packets associated with the same network flow are mapped to the same policy profile. At least some of the network flows are protected during network congestion. The apparatus further includes memory for storing the policy profiles.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, details relating to technical material that is known in the technical fields related to the embodiments have not been described in detail.

The embodiments described herein protect network flows during congestion in a communications network. In the presence of congestion, packet dropping or queuing delays are limited to a subset of flows, thereby protecting the remaining flows from QoS degradation. Network flows are protected without the need for state information for individual flows and thus scale independent of the number of flows and can be easily implemented for high-speed platforms. The embodiments do not cause resequencing of packets within the network flow. As described in detail below, one embodiment is a hashing based stateless flow-aware discard scheme.

Figure 1:
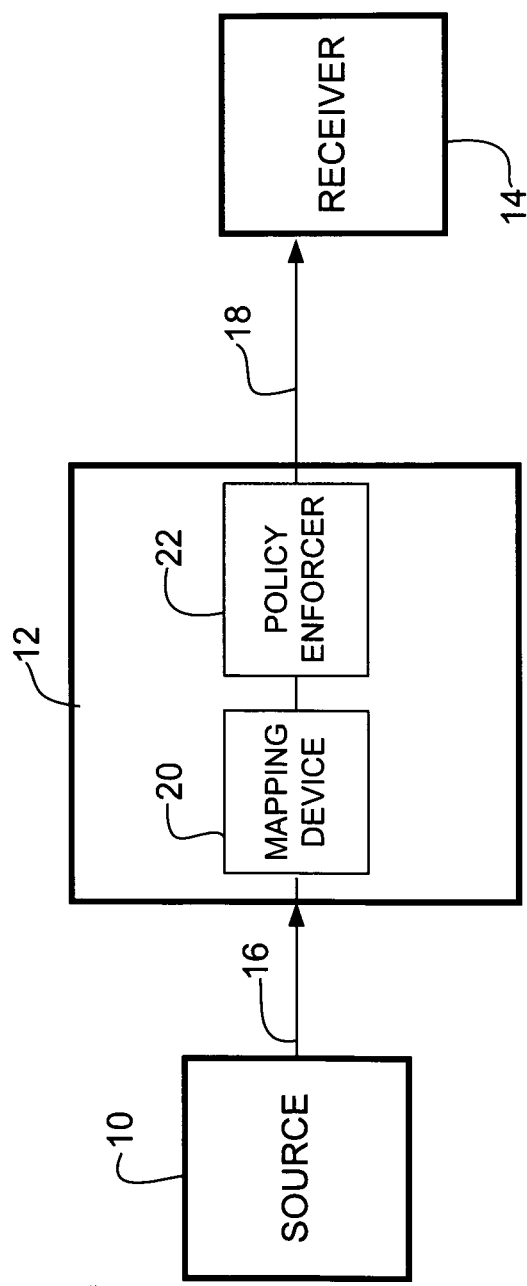
FIG. 1 illustrates an example of a network segment in which embodiments described herein may be implemented.

Referring now to the drawings, and first to FIG. 1, an example of a network segment in which embodiments described herein may be implemented is shown. The embodiments operate in the context of a data communications network including multiple network elements. Some of the nodes in a network that employs the embodiments may be network devices such as routers, gateways, or switches. The network device may include, for example, a master central processing unit (CPU), interfaces, and a bus. The CPU preferably includes memory and a processor. The network device may be implemented on a general purpose network machine such as a computer system or network device described below with respect to FIG. 4.

The example shown in FIG. 1 is a simplified representation illustrating a source (e.g., video, audio, voice source) 10, network device 12, and receiver 14. It is to be understood that there may be any number of nodes or networks between the source 10 and the receiver 14. The network device 12 may be connected to other devices by one or more links including, for example, wide area network (WAN) links, local area network (LAN) links, etc. The source 10 may be a content server or any other host or device providing data such as video. The receiver 14 may be, for example, a personal computer, handheld device, or a subscriber device, such as a home device, set-top-box, customer premise equipment, cable modem, etc., or the receiver may be connected to one or more user devices or networks.

The network device 12 may be, for example, a core router or aggregation router for use in video distribution over Service Provider (SP) access and aggregation networks. The network device 12 may be used in video distribution (e.g., contribution or primary video distribution) over an SP core or an enterprise network, for example. Other applications include OTT (over-the-top) video, enterprise video, etc. It is to be understood that the applications described herein are only examples and that the embodiments may be implemented on any network device supporting network traffic (e.g., router or switch transporting video traffic).

Data traffic flows through the network device 12, which is coupled to adjacent nodes via one or more communication paths (links). In the example shown in FIG. 1, traffic from source 10 is transmitted through path 16 to node 12, and through path 18 to receiver 14. As noted above, paths 16 and 18 may include any number of nodes, links, or networks. For simplification only one node 12 and two links 16, 18 are shown in FIG. 1. The embodiments described herein may be implemented in a network device comprising any number of ingress and egress interfaces.

Any number of flows (e.g., 100-6000) may enter the network device 12. The traffic may be unicast, broadcast, multicast, or any combination thereof. In one embodiment, the network flows entering the device 12 are similar in size. For example, with secondary video distribution, the flows are generally within the 1-10 Mb/s range. The flows may be constant bit rate (CBR) or variable bit rate (VBR). As noted above, the embodiments described herein are stateless, thus information for individual flows does not need to be maintained or known before receiving the flow at the network device 12. Also, there is no need to premark packets before the flows enter the network device 12.

The network device 12 includes a mapping device 20 for assigning network flows to a plurality policy profiles. All packets of a given flow are mapped to the same profile. The network device 12 further includes a policy enforcer 22 operable to enforce the policy profiles. As described further below, the policy may correspond to a weighted tail dropping or marking scheme, priority queuing, or any combination thereof, for example.

Figure 2:
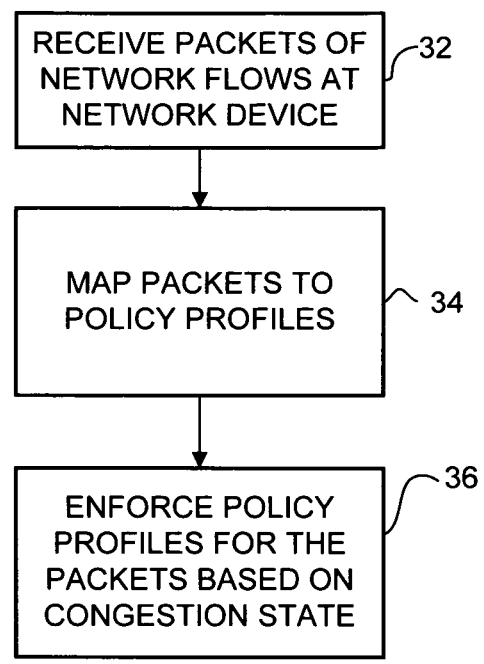
FIG. 2 is a flowchart illustrating an overview of a process for protecting network flows during congestion, in accordance with one embodiment.

FIG. 2 is a flowchart illustrating an overview of a process for protecting one or more network flows, in accordance with one embodiment. At step 32, packets associated with network flows are received at the network device 12. The packets are mapped to policy profiles (step 34). The mapping is independent of congestion level at the network device and all packets associated with the same network flow map to the same policy profile. The policy profiles are enforced for the packets based on a congestion state at the network device (step 36). The policy profile may be enforced when enqueuing, scheduling, or forwarding the packet, for example. During network congestion, some network flows may experience quality degradation, while other flows are protected (i.e., do not experience quality degradation).

In one embodiment, the mapping device 20 comprises a flow-based hash device (e.g., code implementing a hash algorithm) operable to assign packets to a plurality of hash buckets. Each of the hash buckets is associated with one of the policy profiles and all packets within a network flow are hashed to the same bucket. Flows entering the network device 12 are hashed into one of the hash buckets. In the presence of congestion at link 18, a policy is enforced such that flows associated with lower profiles experience quality degradation (e.g., packet drop), while the flows of higher profiles are protected. The heavier the congestion, the higher the number of profiles that are subject to quality degradation (e.g., packet drop) by the policy.

The flow-based hash algorithm deterministically assigns a particular flow to one of the policy profiles using information within the received packet. For example, the hashing algorithm may use information in the received packet, such as source IP address, destination IP address, source port, and destination port. It is to be understood that this is only one example, and any combination of these identifiers or other identifiers may be used in the hash algorithm to distribute the flows among the different profiles.

In one embodiment, the hash algorithm is configured to distribute the flows generally evenly over the hash buckets (policy profiles). In another embodiment, a weighted or biased hash is used to offset the distribution of flows over the different profiles. For example, in one embodiment, the hash may be weighted so that less flows are hashed to specified policy profiles (e.g., lower profiles). As the queue depth builds, the policy is applied to only a few flows to prevent the queue depth from getting higher. Alternatively, a decreasing spacing may be used between profiles as queue depth increases.

Biased hashing may be preferentially applied to certain profiles (e.g., higher or lower profiles) for a select subset of flows. For example, multicast flows may be hashed to a higher threshold than unicast flows to provide greater protection to multicast flows (e.g., broadcast TV) than unicast flows (e.g., Video on Demand (VoD)). This may also be used to prioritize select flows, such as premium IPTV channels, over other flows (e.g., regular channels).

The flows are preferably mapped to the policy profiles independent of congestion level. The term 'congestion level' as used herein refers to the current (instantaneous, short time scale) congestion level (i.e., small, medium, high, or percent congested). In one embodiment, the flow to profile mapping takes into account whether or not there has been congestion within a recent time period (e.g., last few seconds).

Figure 3:
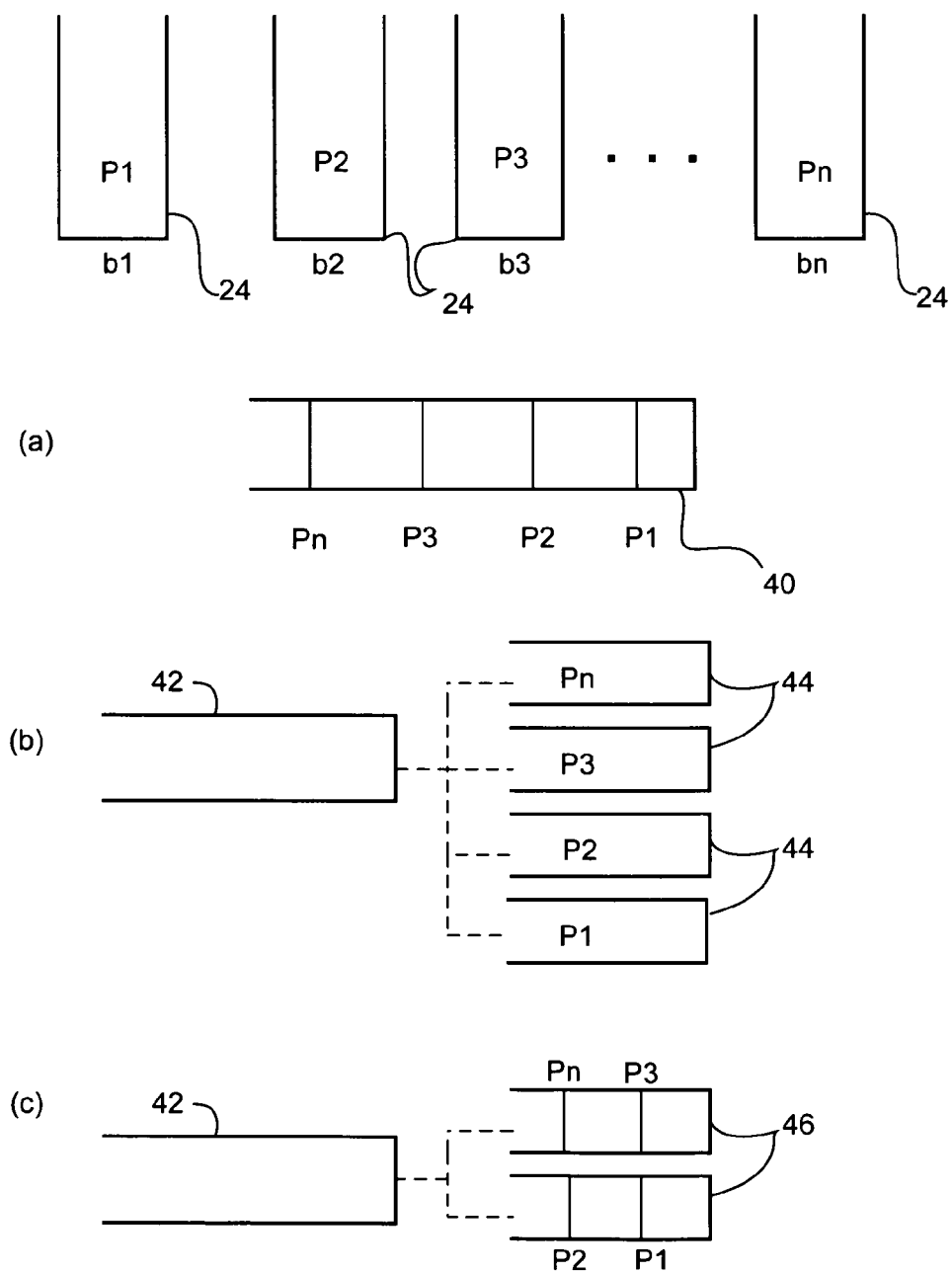
FIG. 3 is a diagram illustrating hash buckets associated with policy profiles and examples of policy profiles defined at queues.

FIG. 3 illustrates examples of how the policy profiles may be defined within the network device 12. As illustrated in FIG. 3, each of a plurality of hash buckets (b1, b2, b3 . . . bn) 24, is associated with a policy profile (P1, P2, P3 . . . Pn). In the first example (identified as (a) in FIG. 3), the policy profile relates to a tail drop threshold based on the occupancy of a shared queue 40 at the network device 12. Each of the profiles corresponds to a tail drop threshold (T1, T2, T3 . . . Tn) defined at the queue 40. If the current queue depth within the queue 40 is below the tail drop threshold for the policy profile associated with the packet, the packet is placed in the queue 40. If the current queue depth within the queue 40 is above the tail drop threshold for the policy profile associated with the packet, the packet is dropped.

In the example indicated at (b) in FIG. 3, the flows are hashed to policy profiles that are enforced by priority queues. Profile differentiation is done via n relative priority child queues 44 within parent queue 42. The child queue for profile Pn has strict (or strong) priority over all of the other child queues. The child queue for P3 has strict (or strong) priority over the child queues for P2 and P1. The child queue for P2 has strict (or strong) priority over the child queue for P1.

In the example shown at (c) in FIG. 3, profile differentiation is done via q relative priority child queues 46 within the parent queue 42 combined with r thresholds within each child queue. In the example shown, q=2 child queues and r=2 thresholds within each child queue, resulting in n=q×r=4 policy profiles.

It is to be understood that the embodiments shown in FIG. 3 are only examples and any number of policy profiles, queues, or hierarchical levels within the queues may be used. In one embodiment, there are at least eight different policy profiles. Also, other policy profile differentiation may be used. For example, multiple levels of coupled policers or hierarchical multi-rate multi-precedence policers may be used.

The threshold defined within the queue ((a) and (c) of FIG. 3) may correspond to a queuing delay (e.g., per hop queuing delay), with each threshold assigned a percentage of a maximum specified queuing delay. The threshold may also correspond to latency, response time, queue occupancy depth (e.g., maximum number of packets or bytes), or any other suitable parameter.

The following describes an example of operation in accordance with the embodiment shown in (a) of FIG. 3. A first packet arrives at network device 12 and the hash device 20 assigns it to bucket b2 that is associated with policy profile P2 having threshold T2. At the time of enqueuing the packet at the egress queue, which is shared across flows from all buckets, the queue occupancy is checked against T2 in order to enforce the policy profile. If the queue occupancy is above T2 (i.e., threshold exceeded), the packet is dropped. If the queue occupancy is below or equal to T2 (i.e., threshold not exceeded), the packet is enqueued for forwarding. A second packet (belonging to a different flow) arrives at the network device 12 and is assigned to bucket b3 that is associated with policy profile P3 with threshold T3. At the time of enqueuing the packet into the egress queue, the queue occupancy is checked against T3. If the queue occupancy is above T3, the packet is dropped. If the queue occupancy is below or equal to T3, the packet is enqueued for forwarding.

In one example, a Service Level Agreement (SLA) involves a maximum per hop queuing of 2 ms. Three thresholds are set at regular intervals from 50% of the maximum acceptable queue depth up to the maximum. The thresholds are therefore T1=1 ms, T2=1.5 ms, and T3=2 ms. The flows are assumed to have similar bandwidths and to be evenly hashed among the hash buckets 24. In this example, if the offered load is 200% of the available capacity and about one third of the traffic is hashed to each of the thresholds, flows equating to about 66% of the available capacity are protected from serious QoS degradation (the flows whose packets are mapped to the policy profile with threshold T3).

As described above, the policy enforcer 22 may use various policies to protect network flows during congestion. In one embodiment, a tail drop mechanism controls congestion using a specific policy to ensure that the maximum number of packets held in the queue is not exceeded. Other policies may be applied so that the system reacts before congestion. Thus, the term 'congestion state' as used herein may refer to congestion/no congestion, congestion level, or a state prior to reaching actual congestion. In one embodiment, when the load reaches a target level that is below the queue scheduling rate, packets may be marked instead of dropped, so that end points may be given a chance to reduce the corresponding flow rates before congestion is actually experienced.

In another embodiment, tail dropping (or marking) may be performed for the different policy profiles using a virtual queue that is drained at the target load (e.g. at 100% or 80% of the queue scheduling rate or at 100% or 80% of the policing rate in the case of a priority queue), rather than the real queue drained at the queue scheduling rate. One example of marking is to change the value of one (or multiple) field(s) in the packet header.

The following are examples of parameters that may be defined at the network device 12 in order to configure the hash buckets and establish the policy profiles. In one embodiment using drop profiles, two parameters may be defined. A queue depth at which a policy starts to be applied to at least some flows (i.e., lowest queue depth for all of the thresholds within the queue) and a queue depth at which the policy is applied to all flows (i.e., highest queue depth for all of the thresholds within the queue). Also, the number of thresholds within the queue (i.e., number of hash buckets 24) or threshold spacing may be specified at the network device 12. In the absence of knowledge of the traffic load, the thresholds may be evenly spaced between the hash buckets 24. The first threshold is preferably set high enough to accommodate natural traffic burstiness, to avoid unintended traffic drop in the case of normal load or underload. For other policies, such as relative priority queues, the number of queues and relative priority of the queues may be defined. The policy profiles and other parameters may be stored in memory at the network device 12. Specific flows or ranges of flows requiring biased hashing may be identified along with the corresponding profiles to which they should be mapped.

Figure 4:
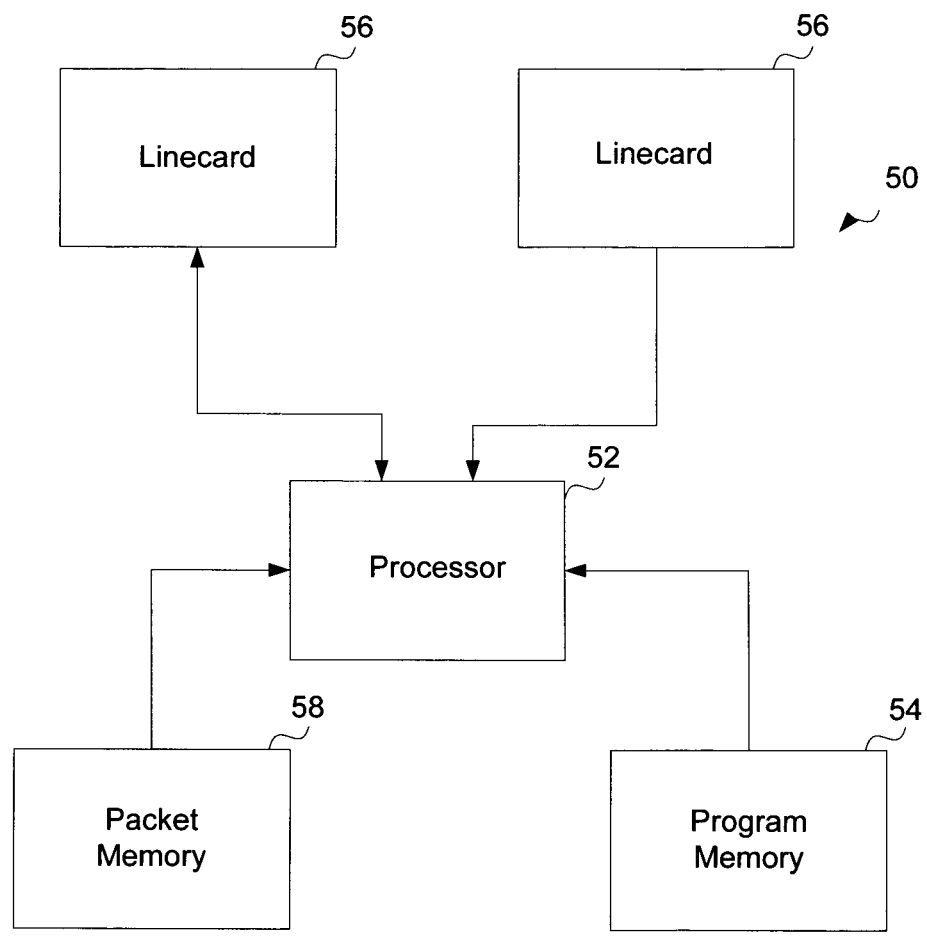
FIG. 4 depicts an example of a network device useful in implementing embodiments described herein.

FIG. 4 depicts a network device 50 that may be used to implement embodiments described herein. Network device 50 is configured to implement all of the network protocols and extensions thereof described herein. In one embodiment, network device 50 is a programmable machine that may be implemented in hardware, software, or any combination thereof. Logic may be encoded in one or more tangible media for execution by a processor 52. For example, the processor 52 may execute codes stored in a program memory 54. Program memory 54 is one example of a computer-readable medium. Program memory 54 can be a volatile memory. Another form of computer-readable medium storing the same codes is a type of non-volatile storage such as floppy disks, CD-ROMs, DVD-ROMs, hard disks, flash memory, etc.

Network device 50 interfaces with physical media via a plurality of linecards (network interfaces) 56. Linecards 56 may incorporate Ethernet interfaces, DSL interfaces, Gigabit Ethernet interfaces, 10-Gigabit Ethernet interfaces, SONET interfaces, etc. As packets are received, processed, and forwarded by network device 50, they may be stored in a packet memory 58. To implement functionality according to the system, linecards 56 may incorporate processing and memory resources similar to those discussed above in connection with the network device as a whole. It is to be understood that the network device 50 shown in FIG. 4 and described above is only one example and that different configurations of network devices may be used.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
receiving packets associated with network flows at a network device;
processing said packets at the network device, wherein processing comprises mapping said packets to policy profiles independent of congestion level at the network device, wherein said packets associated with the same network flow are mapped to the same policy profile; and
enforcing said policy profiles for said packets based on a congestion state at the network device, wherein at least some of said network flows are protected during network congestion;
wherein mapping said packets comprises performing a flow-based hash to assign said packets to a plurality of hash buckets, each of said hash buckets associated with a different one of said policy profiles.

2. The method of claim 1 wherein mapping said packets comprises performing a biased mapping of said packets to said policy profiles so that selected flows are mapped to one or more of specified ones of said policy profiles.

3. The method of claim 1 wherein mapping said packets comprises performing a weighted mapping of said packets to said policy profiles wherein a smaller number of said network flows are assigned to selected said policy profiles.

4. The method of claim 1 wherein said each of said policy profiles comprises a tail drop profile.

5. The method of claim 1 wherein said policy profile corresponds to a queue occupancy in packets or bytes.

6. The method of claim 1 wherein said policy profile corresponds to a relative priority queue in a plurality of queues.

7. The method of claim 1 wherein said policy profile corresponds to a tail drop profile in a specified relative priority queue in a plurality of queues.

8. The method of claim 1 wherein said policy profiles comprise at least eight different policy profiles.

9. The method of claim 1 further comprising:
identifying congestion;
dropping said packets associated with one or more low priority profiles; and
protecting said packets associated with one or more high priority profiles.

10. The method of claim 1 wherein performing said flow-based hash comprises assigning said network flows to said policy profiles based on information contained within said received packets.

11. An apparatus comprising:
a processor for mapping packets associated with network flows to policy profiles independent of congestion level at the apparatus and enforcing said policy profiles for said packets based on a congestion state, wherein said packets associated with the same network flow are mapped to the same policy profile and at least some of said network flows are protected during network congestion; and
memory for storing said policy profiles;
wherein mapping said packets comprises performing a flow-based hash to assign said packets to a plurality of hash buckets, each of said hash buckets associated with a different one of said policy profiles.

12. The apparatus of claim 11 wherein mapping said packets comprises performing a biased mapping of said packets to said policy profiles so that selected flows are mapped to one or more of specified ones of said policy profiles.

13. The apparatus of claim 11 wherein mapping said packets comprises performing a weighted mapping of said packets to said policy profiles wherein a smaller number of said network flows are assigned to selected said policy profiles.

14. The apparatus of claim 11 wherein said each of said policy profiles comprises a tail drop profile.

15. The apparatus of claim 11 wherein said policy profile corresponds to a percentage of a maximum queuing delay.

16. The apparatus of claim 11 wherein mapping said packets comprises mapping said packets based at least in part on whether or not there has been congestion within a recent time period.

17. The apparatus of claim 11 wherein said policy profile corresponds to a relative priority queue in a plurality of queues.

18. The apparatus of claim 11 wherein said policy profiles comprise at least eight different policy profiles.

19. An apparatus comprising:
means for mapping packets associated with network flows to policy profiles independent of congestion level at the apparatus, said packets associated with the same network flow mapped to the same policy profile;
means for enforcing said policy profiles for said packets based on a congestion state at the apparatus, wherein at least some of said network flows are protected during network congestion; and
a flow-based hash device for mapping said packets.

* * * * *